United States Patent

Olsen

[15] 3,655,145

[45] Apr. 11, 1972

[54] CARTRIDGE, CASE AND WEB

[72] Inventor: Alf J. Olsen, Elk Grove Village, Ill.

[73] Assignee: Teletype Corporation, Skokie, Ill.

[22] Filed: Dec. 2, 1969

[21] Appl. No.: 881,344

[52] U.S. Cl. ....................242/197, 242/195

[51] Int. Cl. ..........G03b 1/04, G11b 15/32, G11b 23/04

[58] Field of Search ....................242/197–200, 192, 242/195, 107.2, 74; 274/4 B; 155/189

[56] References Cited

UNITED STATES PATENTS 2,705,115 3/1955 Ewing ....................242/107.2

2,725,097 11/1955 Thoreson ....................155/189

3,006,650 10/1961 Ellmore ....................274/4

3,150,840 9/1964 Briskin et al. ....................242/195

3,197,150 7/1965 Camras ....................242/195 X 3,254,856 6/1966 Camras ....................242/71.8 X

*Primary Examiner*—Leonard D. Christian

*Attorney*—J. L. Landis and R. P. Miller

[57] ABSTRACT

A leader on a web coacts with a hook which projects into a reel chamber in a case to limit web recoil into, and interfere with initiation of web removal from, the case. The leader also coacts with a reel on which the web is wound to prevent web ravel. The leader has an aperture and is fashioned with a pair of sloping shoulders which are wider than the spacing of the reel flanges such that upon web recoil the shoulders engage the flanges causing the leader to bend and displace the aperture toward engagement with the hook and to tension the reel to cause its frictional retention.

14 Claims, 6 Drawing Figures

INVENTOR
ALF J. OLSEN
BY Sherman V. Appel
ATTORNEY

CARTRIDGE, CASE AND WEB

BACKGROUND OF THE INVENTION

The present invention relates to management of coilable reuseable webs such as photographic films and carrier tape for magnetic record tracks. Particularly the invention relates to construction of a web, a case from which the web is recoilably dispensable and a cartridge comprised of a web and the case.

A web of the class with which the present invention is concerned is reuseably storable in a coil about a reel in a case. A leader carried from the web enables its repeated threading through utilizing apparatus. Conventionally, the leader is wider than a dispensing opening in the case and thereby a convenient threading appendage outside the case is insured.

Several heretofore recognized problems require consideration in management of a web of the indicated class, namely: (1) facilitating web removal from its case for threading, (2) prevention of web ravel within its case during web storage.

It is the principal object of the present invention to minimize costs in meeting these problems.

SUMMARY OF THE INVENTION

For effecting the foregoing object in accordance with the invention, a cartridge is comprised of a case having a chamber with an opening to the exterior and a web which is coiled about the hub of a reel mounted for rotation in the chamber for web removal and return through the opening. A leader is mounted on the lead end portion of the web and has an aperture extending therethrough. A hook arranged from the case is adapted to engage in the aperture to limit movement of the web in a recoil direction. A constant length of leader is insured for facilitating threading by fashioning the hook frictionally releasably to hold the leader to interfere with initiation of web removal from the case. Moreover, the leader is proportioned for tensioning the reel for frictionally immobilizing the reel and thereby to obviate web ravel from a coiled condition in the case.

BRIEF DESCRIPTION OF THE DRAWINGS

In the ensuing detailed description, reference is had to the accompanying drawings in which.

DETAILED DESCRIPTION OF THE ILLUSTRATED EMBODIMENT

Figures 1, 2, 3:
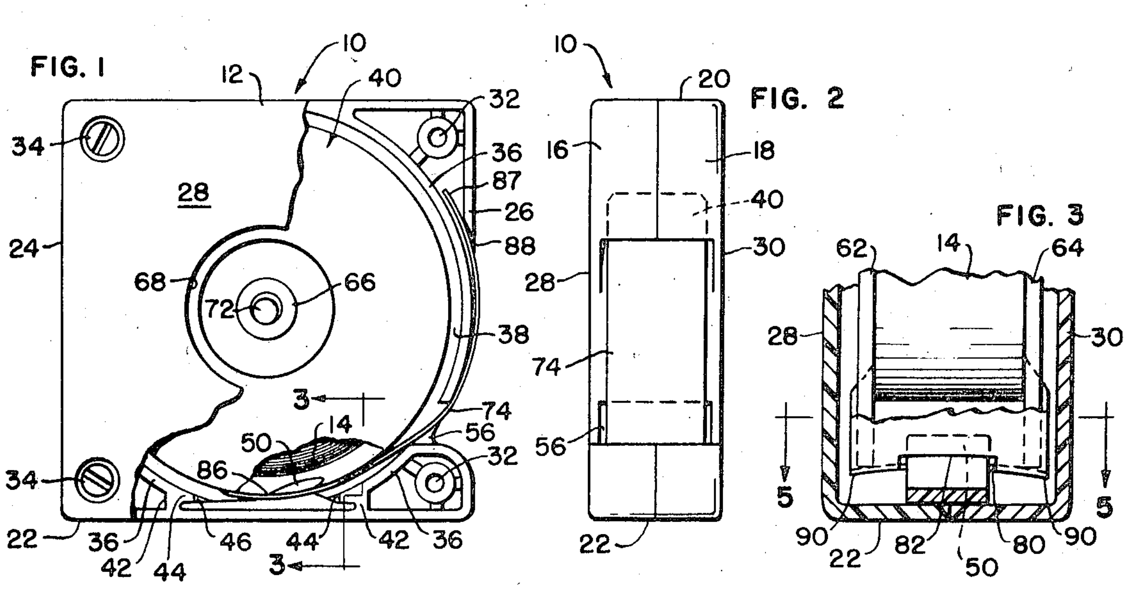
FIG. 1 is an elevational view of a cartridge embodying the present invention, and showing web fully coiled about a reel, parts broken away for the purpose of illustration.
FIG. 2 is an elevational view looking from the right toward the right side of FIG. 1, the reel being shown in dashed lines.
FIG. 3 is a sectional view according to line 3--3 in FIG. 1.

Referring now more particularly to FIGS. 1 and 2, a cartridge generally designated 10 comprises a case 12 and a web 14 coiled therein. Case 12 is of general rectangular configuration and herein comprises a pair of sections 16 and 18 which are releasably connected together. The case is rigid and preferably of transparent plastic fabrication. In the exemplary embodiment it is formed from polycarbonate; however, other suitable materials will be apparent. In any event the material from which the case is formed is not critical to the invention. Accordingly, further description is omitted.

Sections 16 and 18 are fashioned with a pair of perimetric flanges which abut when the sections are operably assembled, in a manner such that (in terms of orientation with respect to the drawings) case 12 has a top wall 20, a bottom wall 22 parallel to the top wall, a rear wall 24 and a forward wall 26, all of which are normal to parallel side walls 28 and 30.

For releasably connecting sections 16 and 18 together, a plurality of internally threaded wells 32 which open toward the inside surface of wall 28 are rigidly carried from wall 30. Fastening means herein shown as a plurality of screws 34 project through wall 28 for threaded reception within said wells.

A plurality of spaced arcuate segments 36 are fashioned integrally with sections 16 and 18 of case 12. These segments are of substantially equal radii of curvature, and comprise means in case 12 defining a broken circular wall comprising the radial limit of a reel chamber 38. A reel generally designated 40 is proportioned for removable reception in the reel chamber between side walls 28 and 30.

In each of the casing sections 16 and 18 corresponding of the segments 36 which are adjacent bottom wall 22 (FIGS. 1 and 6), are supported from the casing by a plurality of integrally fashioned ribs 42. These last mentioned segments in each casing section have a pair of spaced apart extensions 44 which project each toward the other beyond ribs 42. Said extensions generate holding and receiving means in the form of a socket 48 within the case between bottom wall 22 and said segments and an opening 46 between the socket and reel chamber 38. A hook 50 has a body, which extends through opening 46 into reel chamber 32, and a pair of integral anchoring members 52 (FIG. 6) proportioned for removable reception in socket 48. Thereby, the hook is releasably retained in an aspect such that its throat 54 is directed toward a web dispensing opening 56 which is formed in front wall 26 of case 12 and communicatively connects the reel chamber to the case exterior.

Figure 4:
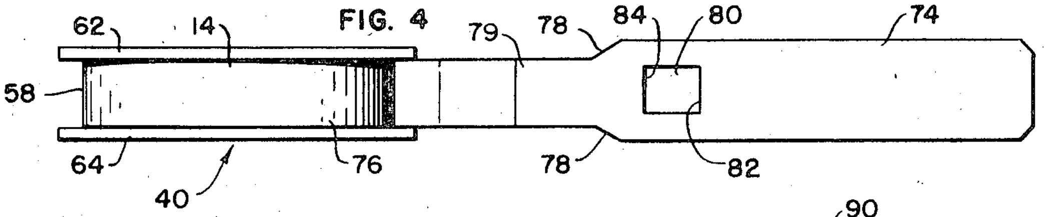
FIG. 4 is a plan view of the web in coiled condition and with its leader extended from the reel.
Figure 5:
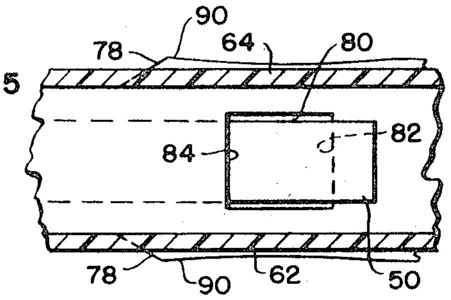
FIG. 5 is a detailed view taken in a plane along line 5--5 in FIG. 3.

Reel 40 has a hub 60 and a pair of parallel spaced apart radially extending flanges 62 and 64 which define therebetween a web chamber 58 (FIG. 4). From one end the hub has a central spindle receiving opening 66. A drive spindle (not shown) for applying torque to the reel in a recoil or rewinding direction when the reel is operably mounted can gain access to said last opening through a hole 68 (FIG. 1) in casing wall 28. From its other end, the hub has an opening 70 which is smaller than but concentric with opening 66. A pin 72 which may be fabricated integrally with casing section 18 has a diameter which is smaller than opening 70 into which said pin projects, normally from side wall 30 when the parts are assembled, for limiting movement of reel 40 in reel chamber 38.

Web 14 herein is an elongated flexible plastic fabrication and is proportioned for enabling its winding in web chamber 58 in successive coils about hub 60. The web is of the general type of which photographic film and carrier tape for a magnetic record track is comprised.

In accordance with the present invention an elongated leader 74 projects axially from the lead end portion 76 of web 14, securance of the web and leader being effected by any suitable means, such as for example, by heating sealing or bonding with a solvent or other suitable adhesive. The leader also may be of flexible plastic fabrication, but preferably, is more rigid than web 14. The width over a major portion of the exemplary leader is greater than the spacing of flanges 62 and 64; and said wide portion has an aperture 80 extending therethrough and centered between opposed leader sides. Also the leader has a pair of opposed sloping shoulders 78. From these project the trail end portion of the leader which comprises a transition piece 79 about the same width as the web for connecting the leader thereto.

The width of dispensing opening 56 is sufficient to permit the leader to enter case 12 and to be drawn into reel chamber 38 when the web is coiled. Hook 50 is proportioned such that it is disposed between reel flanges 62 and 64 and it is arranged such that it provides a bearing surface over which web 14 rides as it moves toward and away from opening 56 during web dispensing and recoil. However the size of the hook is insufficient to prevent accommodation of the entire web in a coil about hub 60.

Figure 6:
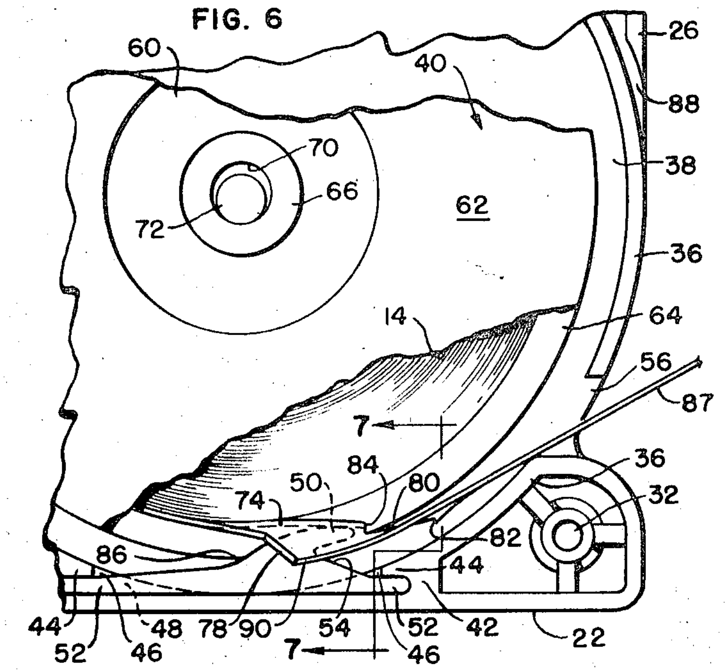
FIG. 6 is an enlarged side elevational view of a fragment of the reel, and showing the web in a different condition from that shown in FIG. 1, parts broken away for the purpose of illustration.

Upon first engagement of the shoulders 78 with flanges 62 and 64 (FIG. 6) during normal recoil of web 14, recoil torque will cause the leader to bend and displace aperture 80 away from hub 60 (FIG. 6). Further recoil will result in additional displacement of the aperture 80 into alignment with throat 54 of hook 50, whereupon additional recoil, leading margin 82 of aperture 80 will interlock in throat 54, and further recoil thereafter will be prevented. (FIGS. 1 and 3).

The parts are proportioned such that the trail margin 84 of aperture 80 (FIG. 4) will seat along a line 86 (FIGS. 1 and 6) transversely of the upper surface of the hook 50, the latter being fashioned such that it serves as a light frictional catch to interfere with and resist dispensing movement of the leader from hooked position. In consequence, the leader cannot be shaken from case 12 and an intentional forward torque will be required to initiate web dispensing once the leader is locked to prevent further recoil. By reason of the described arrangement a constant length of the leader will project outwardly from the case following each recoil such that rethread of the web in utilizing apparatus (not shown) can be automatically repeatedly readily achieved. The end portion 87 of the leader which remains outside of case 12 following recoil may be tucked into a slot 88 (FIG. 1) which is formed in case 12 above opening 56.

Figure 7:
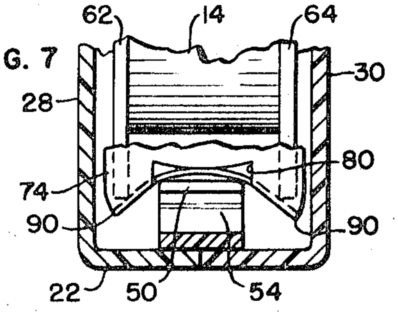
FIG. 7 is a sectional view according to line 7--7 in FIG. 6.

As the marginal side portions 90 (FIGS. 3 and 7) of the leader 74 are drawn beneath flanges 62 and 64 during recoil, the leader assumes an upwardly bowed configuration in transverse section and generates a reelward tension. This force displaces or radially shifts the reel upwardly, thereby causing engagement of the bottom of pin 72 with the margin of hub opening 70 (FIG. 6) and generates sufficient friction to immobilize reel 40 against forces of a magnitude usually encountered when the web is in a storage condition in case 12. Thereby, ravel of the web for the most part, can be prevented when the leader is locked on the hook.

The aforedescribed immobilization can be augmented by fashioning the hook such that the marginal portions of the leader will be frictionally trapped between the flanges and the hook when the leader is in hooked position.

As many modifications in the described construction could be conceived, and as many changes could be made therein without departing from the spirit and scope of the claims, it is intended that all matter contained in the accompanying specification shall be considered as illustrative only and not in a limiting sense.

I claim:

1. A cartridge comprising:
   - a case having a chamber with an opening to the exterior;
   - a reel with a hub mounted for rotation in said chamber;
   - a web coiled about said hub for removal from and return to for recoiling in said chamber through said opening and having a lead end portion;
   - a leader mounted on said lead end portion and having an aperture extending therethrough, and
   - a hook arranged from said case for engaging in said aperture to limit movement of said web in a recoiling direction.

2. A combination according to claim 1 characterized by means for displacing said aperture toward engagement with said hook as the lead end portion is moved in a recoiling direction.

3. A combination according to claim 2 wherein said hook is disposed in said chamber and provides a bearing surface over which said web travels during removal from and return to said chamber.

4. A combination according to claim 2 wherein said displacing means comprises a pair of spaced apart reel flanges between which said web is coiled about said hub and means on said leader for engaging said flanges after said lead end portion is returned to said chamber.

5. A combination according to claim 4 wherein said engaging means comprises a pair of opposed marginal side portions of said leader having a width greater than the width of said web and flanges for engaging said flanges upon recoil movement of said web.

6. A combination according to claim 5 wherein said marginal side portions have a pair of tapered shoulders comprising elements of said leader for first engaging said flanges during recoil movement.

7. A combination according to claim 5 wherein said case has a pair of parallel side walls, said hook is disposed midway between said side walls and said aperture is centered with respect to said side portions.

8. A combination according to claim 1 wherein the leader has a portion projecting from said case following limitation of web movement and characterized in that said case has an external slot spaced from said opening for removably receiving said portion.

9. A combination according to claim 1 wherein said hook is fashioned for frictionally engaging and releasably holding said leader to interfere with initiation of web removal from said case through said opening.

10. In a case of the type having a pair of connected together case sections defining a reel chamber and adapted for recoilably dispensing a web from said chamber through a case opening, and having a hook projecting into said chamber for engaging in a web aperture to limit web movement in a recoil direction, the improvement comprising a pair of spaced apart wall segments perimetrically limiting said reel chamber, said segments being integral with, spaced from, and defining a socket within said case outside of said reel chamber for receiving and holding said hook.

11. In a web of the type adapted for storage in a coil on a flanged reel in a case and having a leader mounted on its lead end portion for facilitating removal of said web from said case, the improvement characterized in that said leader is wider than said web for engaging the flanges of said reel when said tape is recoiled on said reel following removal therefrom, said leader has a trail end portion proximate said web, said trail end portion having a pair of sloping shoulders proportioned for engaging the flanges of said reel upon web recoil, and said leader has an aperture proportioned to cause said leader to bend transversely of said web when said shoulders are drawn into flange engagement.

12. A cartridge comprising:
   - a case having a chamber therein with an opening to the exterior;
   - a reel with a hub and a pair of spaced apart radial flanges mounted for rotation and radial shifting in said chamber;
   - a web having a trail end portion connected to said reel and arranged for passing through said opening in dispensing and recoiling directions; and
   - a leader on said web proportioned for tensioning said web and radially shifting and frictionally immobilizing said reel when said web is recoiled about said hub to prevent web ravel in said case.

13. A combination according to claim 12 wherein said hub has an opening and characterized by a pin fixed to said case and disposed in said opening for frictionally restraining said hub when said reel is radially shifted.

14. A combination according to claim 13 wherein said leader is wider than the spacing of said flanges for engaging and tensioning said reel against said pin while said web is moved in a recoil direction.

* * * * *